No. 611,938. Patented Oct. 4, 1898.
M. QUINN.
COMBINATION COOKING AND HEATING STOVE.
(Application filed June 24, 1897.)
(No Model.) 2 Sheets—Sheet 1.

Witnesses
C. W. Bradway.
Victor J. Evans

Inventor
Martin Quinn.
By John Wedderburn
Attorney

THE NORRIS PETERS CO., PHOTO-LITHO., WASHINGTON, D. C.

No. 611,938. Patented Oct. 4, 1898.
M. QUINN.
COMBINATION COOKING AND HEATING STOVE.
(Application filed June 24, 1897.)
(No Model.) 2 Sheets—Sheet 2.

Witnesses
C. W. Bradway.
Victor J. Evans

Inventor
Martin Quinn
By John Wedderburn
Attorney

UNITED STATES PATENT OFFICE.

MARTIN QUINN, OF BLACK ROCK, ARKANSAS.

COMBINATION COOKING AND HEATING STOVE.

SPECIFICATION forming part of Letters Patent No. 611,938, dated October 4, 1898.

Application filed June 24, 1897. Serial No. 642,112. (No model.)

*To all whom it may concern:*

Be it known that I, MARTIN QUINN, of Black Rock, in the county of Lawrence and State of Arkansas, have invented certain new and useful Improvements in Combination Cooking and Heating Stoves; and I do hereby declare the following to be a full, clear, and exact description of the invention, such as will enable others skilled in the art to which it appertains to make and use the same.

This invention relates to improvements in combined heating and cooking stoves.

The object of the invention is to provide a stove or heating apparatus of considerable capacity which may be used both for heating and for cooking during the cold season or winter time and which by substitution of false grates of small area and by reason of the sets of dampers which are used whatever fire is applied will be concentrated to a small part of the stove, and it will thus answer for cooking purposes during the summer or warm weather. In other words, the stove is converted into a cooking-stove, requiring no more fuel than necessary to perform the office of cooking in a cooking-stove of moderate dimensions.

The invention consists, largely, in an arrangement of dampers and hot chambers for directing the products of combustion either directly to the smoke-flue or indirectly through a series of hot chambers and thence to the smoke-flue.

The invention also consists in novel means for locking and securing a tilting damper in any desired or adjusted position for purposes of regulating the draft and directing the products of combustion through the passages and chambers that may be desired.

Figure 1:
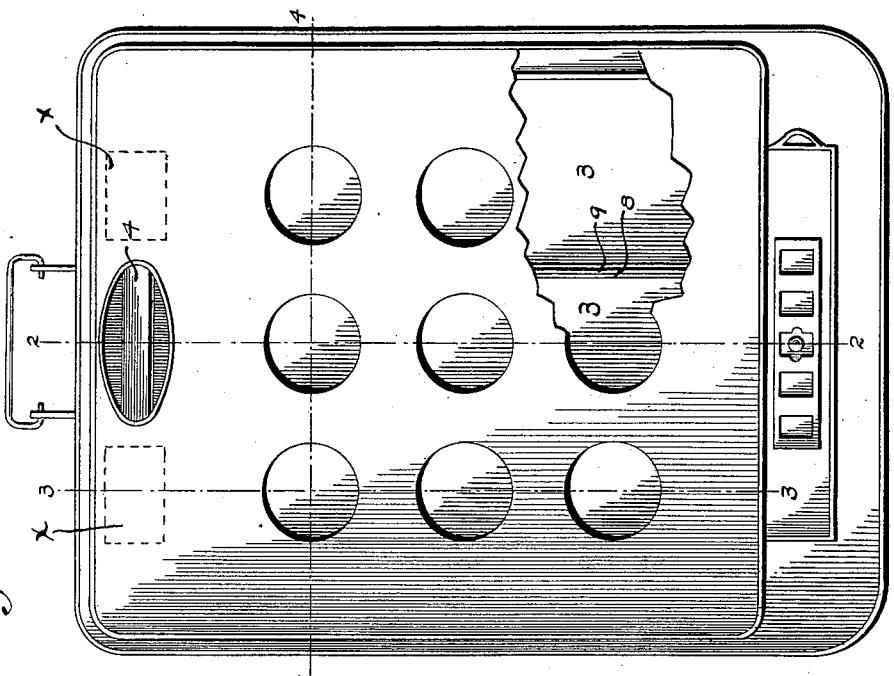
Figure 2:
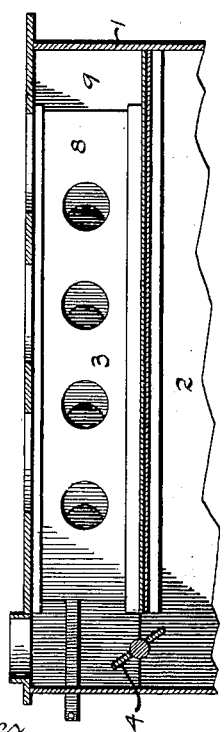
Figure 3:
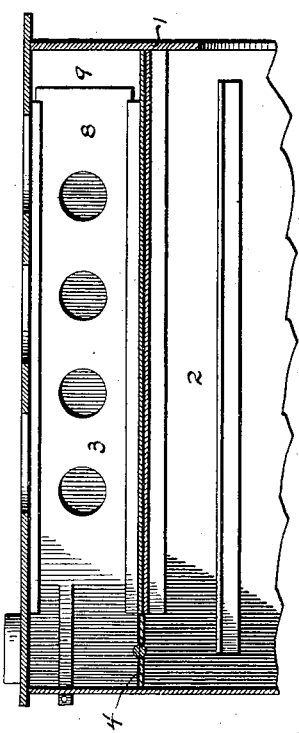
Figure 4:
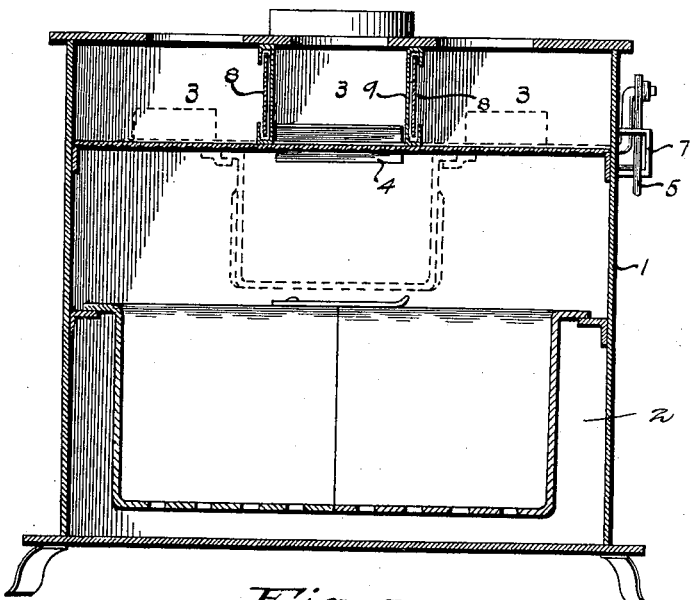
Figure 5:
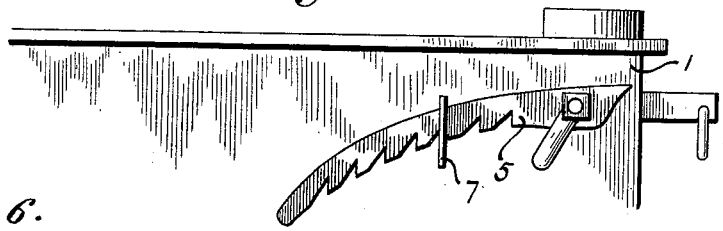
Figure 6:
Figure 7:
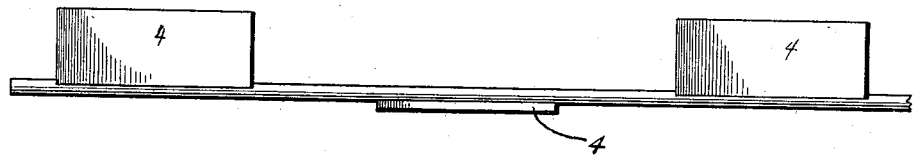

In the drawings forming part of this specification, Figure 1 is a top or plan view of one form or style of stove embracing my invention, a part of the top being removed to show the interior arrangement and the parallel dampers being drawn out. Fig. 2 is a section through the upper part on the line 2 2 of Fig. 1. Fig. 3 is a similar section on the line 3 3 of Fig. 1. Fig. 4 is a section at right angles to the other sections on line 4 4 of Fig. 1; and Fig. 5 is a side view of the upper right-hand corner of the stove, looking toward the left, showing my improved means for holding the vibrating damper in adjusted position. Figs. 6 and 7 illustrate in elevation different positions of the tilting or vibrating dampers.

1 is the body of a stove having a large fire-box or combustion-chamber 2. The grate may be of such dimensions as to cover substantially all of the lower space of this combustion-chamber, or it may be made narrower than the chamber or narrower and shorter than this chamber. Above the combustion-chamber and between it and the top of the stove is what I call the "hot" chamber or chambers, the space between the top of the combustion-chamber and the top of the stove being divided into three compartments 3 3 3, and in the form in which I have shown this invention the top of the stove is provided with pot-holes over and along each of these compartments. In the rear and opposite the middle compartment of the stove is a smoke-flue leading to the stovepipe or chimney. Across the mouth of this smoke-flue and smoke-ports $x\ x$ I arrange tilting dampers 4 in such way that I may cut off the flow of products of combustion directly through the smoke-flue and cause them to be deflected through smoke-ports $x\ x$ in the two side compartments 3 3 to the front of the stove and thence back through the middle compartment to the stovepipe or chimney-flue. The vibrating dampers are readily adjustable to any desired position, either horizontal or vertical, or to any point between these planes, by means of a notched segmental piece 5, which is guided in and interlocks with a loop or catch 7 on the side of the stove.

In order that the products of combustion and heat which are deflected into the side chambers 3 3 may be filtered gradually from said chambers to the center chamber or be compelled to pass entirely around into the end of the central chamber, I provide two parallel sliding dampers or gates 8 8 with perforations and provide the partitions between the compartments 3 3 also with perforations or holes 9 9, so organized that when the sliding dampers are in one position—for example, when they are pushed all the way in—the perforations or holes will be closed; but when they are drawn all the way out the holes in the dampers and partitions will register with each other, leaving a free passage laterally from the side chambers into the middle chamber. By reason of this arrangement the products of combustion may be permitted to pass directly to the chimney-flue while kindling a fire. They may then by adjusting the vibrating damper be caused to pass through the side chambers 3 3 and thence through the central or middle chamber out through the smoke-flue to the atmosphere.

In cold weather it will be desirable to compel the products of combustion to pass around through the outside chambers and inside chamber, in which case any or all of the kettle-holes may be used at the pleasure of the user for cooking purposes. In summer time and when heating of the room or space is not needed or is undesirable the main grate in the fire-box may be removed and a small false grate may be substituted in place of that and a small local fire built within this space, and the grate may be so raised as to cause the fire to impinge directly against the roof or wall of the fire-chamber, and thus localize the heat opposite the central heating-chamber, in which case the holes over such chamber would be used for cooking purposes by the user, the products of combustion being permitted to pass directly to the smoke flue or pipe.

Having thus described my invention, what I claim as new, and desire to secure by Letters Patent, is—

1. The combination in a stove, of a combustion-chamber, smoke-ports and a smoke flue or pipe, vibrating dampers arranged athwart the smoke-ports and smoke-flue, a series of parallel hot chambers, and sliding dampers between said chambers, substantially as described.

2. In a stove and furnace, the combination of a combustion-chamber, smoke-ports and a smoke-flue, vibrating dampers arranged athwart said ports and flue, means for locking or anchoring said dampers in adjusted position, a plurality of hot chambers, and a sliding damper interposed between said chambers, substantially as described.

3. In a cooking and heating stove, the combination of a combustion-chamber, parallel hot chambers, parallel sliding dampers smoke-ports, a smoke-flue, vibrating dampers athwart said smoke-flue, and a notched segmental piece 5 for holding said dampers in position, substantially as described.

In testimony whereof I have signed this specification in the presence of two subscribing witnesses.

MARTIN QUINN.

Witnesses:
PETER I. YOCHIM,
GEORGE GIBSON.